N. AUBIN.
Fluid Meter.
No. 2,918. Reissued April 14, 1868.
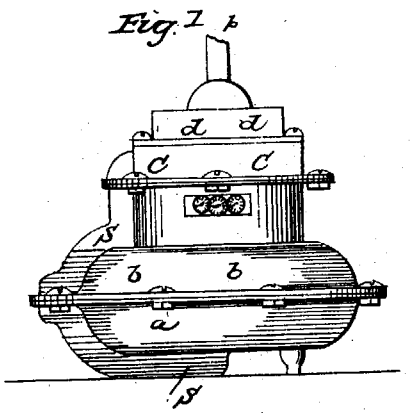
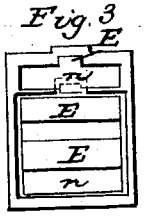
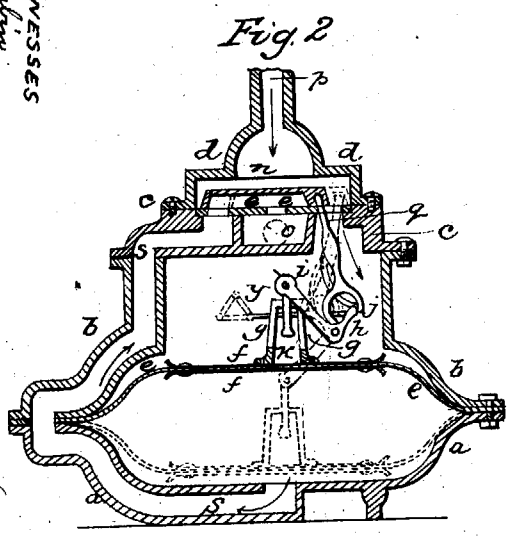
WITNESSES
J. Aubin
Eug. de Roy.
INVENTOR
N. Aubin
N. PETERS, Phot.-Lithographer, Washington, D. C.

United States Patent Office.

NAPOLEON AUBIN, OF MONTREAL, CANADA.

*Letters Patent No.* 36,201, *dated August* 19, 1862; *reissue No.* 2,918, *dated April* 14, 1868.

IMPROVEMENT IN FLUID-METERS.

The Schedule referred to in these Letters Patent and making part of the same.

TO ALL WHOM IT MAY CONCERN:

Be it known that I, NAPOLEON AUBIN, a citizen of the United States, at present residing in Canada, have invented certain new and useful Improvements in Fluid-Meters; and that the following, taken in connection with the drawings, is a full, clear, and exact description thereof. In the drawings—

Figure 1 is an elevation of the meter.

Figure 2 is a vertical section through the same.

Figure 3 is a plan of the valve-seat seen from the lower side.

This meter has been devised to operate without materially obstructing the flow of water in the pipes connected with it, and to combine simplicity and cheapness of construction with accuracy of measurement, whether the head or pressure of water in the said pipes is high or low.

Its main features are a short slide-valve to avoid back pressure and cheapen construction, a reversing-apparatus operating in connection with said valve, and arranged to throw it rapidly across the ports when changing its position, to avoid material leakage, and a diaphragm; and there are in it certain novelties of construction, and also a novel combination of mechanism, as will appear from the following description, (see fig. 2.)

*a a*, *b b*, *c c*, *d d*, are four pieces, forming the case of the meter. The former two constitute the measuring-chamber of the meter, and also contain the tumbling-bob or reversing-apparatus, and likewise constitute a side-pipe. The piece *c c* contains the passages leading from the ports, and the piece *d d* forms the valve-chest. The valve-seat E E is a separate piece, merely dropped into place, and is made separate, that it may be of composition to guard against rust and wear, and may be readily fitted for use before placing it in the meter, which can be of iron.

The diaphragm *e e* is confined between the parts *a a* and *b b*, where they are joined to each other, and packs the joint between them in whole or in part. It may be of India rubber, leather, or other suitable material, and has bolted to it two plates, *f f*, and also, when constructed as in fig. 2, a standard, *g g*, which may be either two staples, as shown in said fig. 2, secured side by side, with an interval between them, or a hollow frustum of a cone, or cylinder, or box with a hole in the top.

Just above the utmost range of the diaphragm, in fig. 2, is secured a rock-shaft, *h*, having two arms, *i* and *j*. To the former of these is pivoted a rod, *k*, with a T-head, which lies in the conical frustum, or between the staples *g g*. The latter, *j*, enters a fork on the lower end of a lever, *l*, which is pivoted near its centre, and the upper end of which passes through one of the ports in the valve-seat, and enters into a hole or nose in the valve. A spring, *m*, bears upon a pin projecting from the arm *j*, and is secured at its upper end; it is therefore compressed by the rock-shaft, when the arm *j* is forced to rise from either side towards the vertical, and when *j* has passed the vertical in either direction, the spring expands and throws the rock-shaft over.

The rock-shaft, arms, rod, spring, and lever, I term the reversing-apparatus, and a weight may be used in place of the spring, and the apparatus may be variously modified so long as a weight is raised or a spring compressed by the motions of the diaphragm, or its equivalent, either up or down, and then by the falling of the weight, or the expansion of the spring, a valve is moved.

The valve-seat E E has in it, as usual, three ports, the centre one leading to the exhaust-passage *o*, and the other two, one to each side of the diaphragm. Upon this seat slides a short slide-valve, *n*, of such length that it will not cover both outside ports at the same time, and, therefore, while travelling over said ports, will always leave space for the water to pass around and under both its ends.

This peculiarity of construction, by relieving the valve from back pressure while in motion, enables it to be moved by a spring comparatively slight, even when the meter is used under a high head of water; and when such a construction of the valve is combined, as above described, with proper means to throw it quickly across the ports, I regard the combination as the main feature of this meter. It is to this, chiefly, that it owes its simplicity and cheapness of construction, its operation under a high head of water as readily as when the pressure is small, and the very slight extent, (far less than by any other meter used in this country, according to tests publicly made by various city water companies,) to which it retards the flow of the water passing through it. It is true that while the valve is in motion, some water escapes without being measured, but from the rapidity of such motion the time for leakage is so short, the amount of it is not material, being only one or two per cent. of all the water passing through the meter, and even that leakage can be allowed for in adjusting the registering-apparatus.

It is further evident from the above peculiarity of construction, that the length of the valve, the area of the ports being the same, should depend upon the character of the head or pressure under which the meter is to work; that is to say, that meters intended for use where the said head is very great, should have valves shorter than those intended to be used under a light head, although such construction makes a little more leakage to be allowed for in adjusting the registry of the meter, because the more space there is left at the ends of the valve when in motion for the water to escape, the less obstruction there will be to its passage through the meter, and consequently the less back pressure on the valve for the spring to overcome.

The meter shown in fig. 2 being constructed as above, its operation is as follows: Water enters through the induction-pipe *p*, and thence flows through the port *q*, and depresses the diaphragm. Water beneath the diaphragm will flow out through the passage *s*, through the outside port, covered by the valve, and from under the valve out through the exhaust *o*. When the diaphragm descends so low that the top of *g* strikes the T-head on *k*, the rock-shaft will begin to move and compress the spring. When its arm *j* reaches the vertical, the spring will expand suddenly and throw the rock-shaft over, thereby causing the lever *l* to reverse the valve, so that water will now enter through *s*, and flow out through *q*, and the diaphragm will commence to rise, and will keep rising. While the diaphragm is so rising, its upper plate will strike the T-head, which will move the rock-shaft and cause it to compress the spring, until the latter throws the valve over again into the position shown in the drawing.

In this meter I use a diaphragm to measure the water and actuate the reversing-apparatus, because I regard it as better and cheaper than a ring and plunger, but the latter can be used, and, by modifying the reversing-apparatus, also other devices.

It will further be observed that no stuffing-boxes are used to make connections between the diaphragm and valve, and that the side-pipe is cast or found in both parts of the case, the joint in it being packed by a part of the diaphragm having a hole cut through it.

And it will also be noticed that from the slight power required to operate the valve, both the reversing-apparatus and the spring can be of small size and cheaply made, and are little exposed to friction and strain. The spring also being a compression-spring, with little to do, is the only kind which will answer in water-meters; no spring, whether of metal or rubber, being reliable for that work, when it acts, or acquires its power for action, by being stretched.

It is also evident that, although for the use of water companies in cities, where there is always a considerable pressure of water in the pipes, a meter constructed as mine is, with a single valve, would not work, (except it were made of a large and expensive size, and with springs so powerful that the friction and concussion would soon destroy the apparatus,) unless such valve were in effect balanced as mine is, yet that where there is little pressure to overcome, a valve with lap can be used, and accordingly I sometimes intend to use such a valve.

I also, of course, provide means of registering the strokes of the diaphragm, by an appropriate counter attached to some moving part of the reversing-apparatus, as indicated by the rod and lever, *x y* in fig. 2; and also sometimes to cast the parts *b b* and *c c* together; and also to pivot the reversing-apparatus in a frame which can be fitted outside of the meter, and afterwards bolted in its place therein; and also to have the valve guided in its motion by standards sliding on a rod, *q*, fixed above the valve, as shown in fig. 3.

What I claim as of my own invention, and desire to secure by Letters Patent, is as follows, to wit:

I claim the combination of a diaphragm with a reversing-apparatus and a slide-valve, connected each with the other, without the use of stuffing-boxes, and the whole enclosed within a proper receptacle containing a valve-seat, and constituting a fluid-meter, constructed and operating substantially as above described.

I also claim constructing fluid-meters with a single slide-valve of such length that it will not cover both of the outside ports in the valve-seat at the same time, in combination with a reversing-apparatus arranged to throw said valve, while acting upon it, rapidly across the said ports, substantially as and for the purpose above described.

I also claim the use, in fluid-meters, of a diaphragm, when combined with a short slide-valve of the above description, substantially as and for the purpose above described.

I also claim the use, in fluid-meters, of compression-springs, when combined with a short slide-valve of the above description, substantially as and for the purpose above described.

I also claim constructing the receptacle of fluid-meters in two pieces, one half of which contains part of the side-pipe, and the other half the other part thereof, when the joint between the two is made by a diaphragm, and the latter acts upon a reversing-apparatus contained in one half of the said receptacle, substantially as above described.

N. AUBIN.

Witnesses:
Z. AUBIN,
LOUIS BÉIQUE.